(12) United States Patent
Lev et al.

(10) Patent No.: US 11,982,781 B2
(45) Date of Patent: May 14, 2024

(54) SEISMIC SOURCE FOR ON THE MOVE SEISMIC SURVEYING

(71) Applicants: ELBIT SYSTEMS C4I AND CYBER LTD, Netanya (IL); SOREQ NUCLEAR RESEARCH CENTER, Yavne (IL)

(72) Inventors: Aner Lev, Nahal Soreq (IL); Barak Alfassi, Netanya (IL); Alon Refael Heimer, Netanya (IL); Shai Mordechai Butzin, Netanya (IL)

(73) Assignees: ELBIT SYSTEMS CAI AND CYBER LTD, Netanya (IL); SOREQ NUCLEAR RESEARCH CENTER, Yavne (IL)

( * ) Notice: Subject to any disclaimer, the term of this patent is extended or adjusted under 35 U.S.C. 154(b) by 0 days.

(21) Appl. No.: 18/297,879

(22) Filed: Apr. 10, 2023

(65) Prior Publication Data
US 2023/0314643 A1    Oct. 5, 2023

Related U.S. Application Data

(63) Continuation of application No. PCT/IL2021/051215, filed on Oct. 11, 2021.

(30) Foreign Application Priority Data

Oct. 12, 2020    (IL) .......................................... 277996

(51) Int. Cl.
*G01V 1/143*    (2006.01)
*G01V 1/22*    (2006.01)
*G01V 1/34*    (2006.01)

(52) U.S. Cl.
CPC .............. *G01V 1/143* (2013.01); *G01V 1/226* (2013.01); *G01V 1/345* (2013.01)

(58) Field of Classification Search
CPC ........ G01V 1/143; G01V 1/226; G01V 1/345; G01V 1/147; G01V 1/155; G01V 1/18; G01V 1/09; G01V 1/047; G01V 1/00; G01V 2210/00; G01V 1/28
See application file for complete search history.

(56) References Cited

U.S. PATENT DOCUMENTS

| 3,306,391 | A |   | 2/1967 | Bays |
| 3,310,128 | A | * | 3/1967 | Chelminski ............ G01V 1/047 181/114 |
| 3,583,521 | A |   | 6/1971 | Anstey |
| 3,676,841 | A |   | 7/1972 | Anstey |

(Continued)

FOREIGN PATENT DOCUMENTS

| AU | 2020327713 A1 * | 3/2022 | ............... G01H 9/00 |
| CN | 201489120 U * | 5/2010 | |

(Continued)

OTHER PUBLICATIONS

Hasan Tariq et al. "Design and Implementation of a Programmable Multi-Parametric Five Degrees of Freedom Seismic Waves Geo-Mechanics Simulation IoT Platform", Preprints Jul. 2019, 2019070324 (doi: 10.20944/preprints201907.0324.v1).

*Primary Examiner* — Daniel Pihulic
(74) *Attorney, Agent, or Firm* — Browdy and Neimark, PLLC

(57) ABSTRACT

A seismic source apparatus, configured to be maneuvered by a vehicle over terrain.

20 Claims, 11 Drawing Sheets

(56) References Cited

U.S. PATENT DOCUMENTS

| | | | |
|---|---|---|---|
| 4,842,094 A | 6/1989 | Willis et al. | |
| 5,396,029 A | 3/1995 | Talke | |
| 5,614,670 A * | 3/1997 | Nazarian | G01M 7/08 |
| | | | 73/146 |
| 8,651,228 B2 | 2/2014 | Eick et al. | |
| 8,797,828 B1 | 8/2014 | Lev et al. | |
| 9,229,120 B2 | 1/2016 | Eick | |
| 9,557,429 B2 | 1/2017 | Castor et al. | |
| 9,664,807 B2 * | 5/2017 | Olivier | G01V 1/38 |
| 9,759,827 B2 | 9/2017 | Sallas et al. | |
| 2002/0149998 A1 | 10/2002 | Hoover et al. | |
| 2005/0002527 A1 | 1/2005 | Codet et al. | |
| 2007/0235250 A1 | 10/2007 | Krumhansl et al. | |
| 2011/0103186 A1 | 5/2011 | Krumhansl et al. | |
| 2011/0251968 A1 | 10/2011 | Parker | |
| 2012/0205188 A1 | 8/2012 | Fullerton | |
| 2014/0293741 A1 | 10/2014 | Halliday et al. | |
| 2016/0334522 A1 | 11/2016 | Eick | |
| 2018/0038971 A1 * | 2/2018 | Andersen | B60D 1/58 |
| 2022/0342110 A1 * | 10/2022 | Lev | G01V 8/26 |
| 2023/0314643 A1 * | 10/2023 | Lev | G01V 1/226 |
| | | | 367/14 |

FOREIGN PATENT DOCUMENTS

| | | | | |
|---|---|---|---|---|
| CN | 202758076 U | * | 2/2013 | |
| CN | 218446020 U | * | 2/2023 | |
| EP | 4014074 A1 | * | 6/2022 | G01H 9/00 |
| RU | 2289150 C1 | * | 12/2006 | |
| RU | 2453870 C2 | * | 6/2012 | |
| SU | 805220 B | * | 2/1981 | |
| WO | 1999051995 A2 | | 10/1999 | |
| WO | 2013166046 A1 | | 11/2013 | |
| WO | WO-2021028905 A1 | * | 2/2021 | G01H 9/00 |
| WO | WO-2022079712 A1 | * | 4/2022 | G01V 1/047 |

* cited by examiner

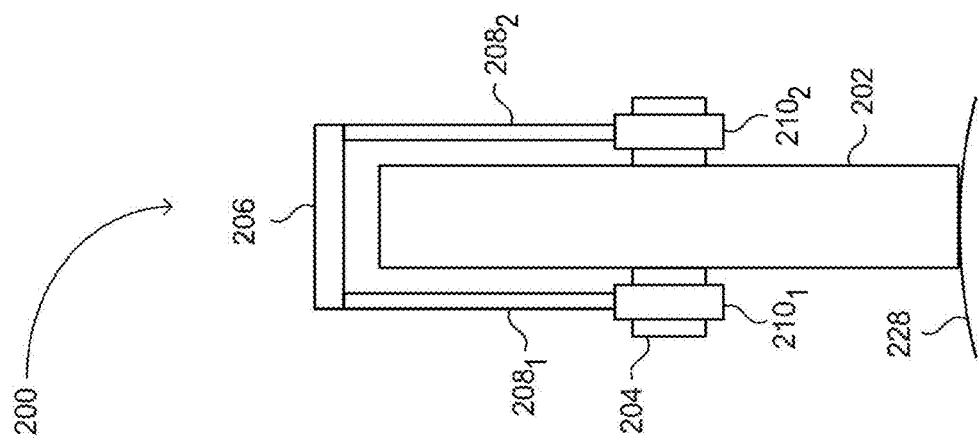
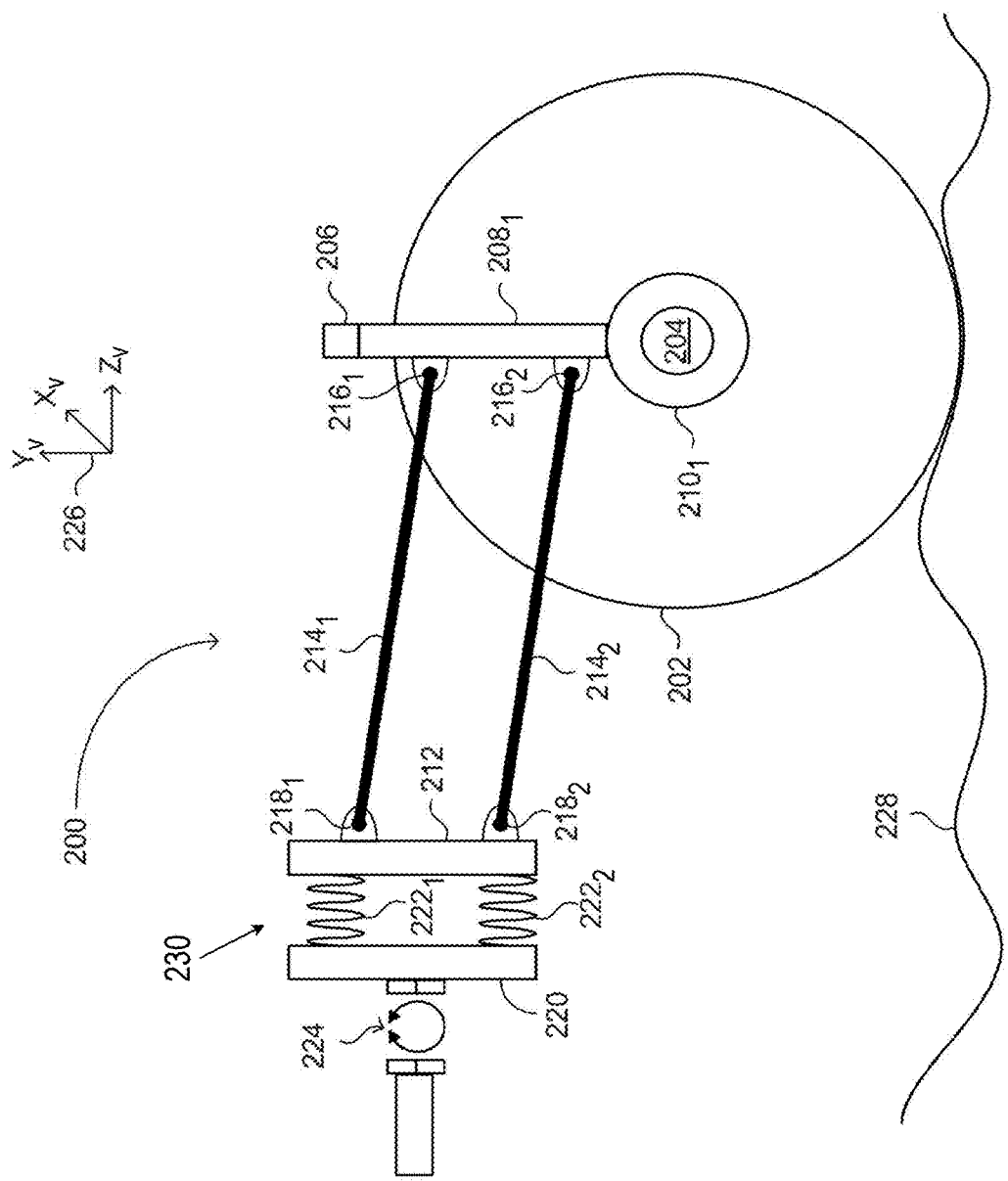
FIG. 2B
FIG. 2A

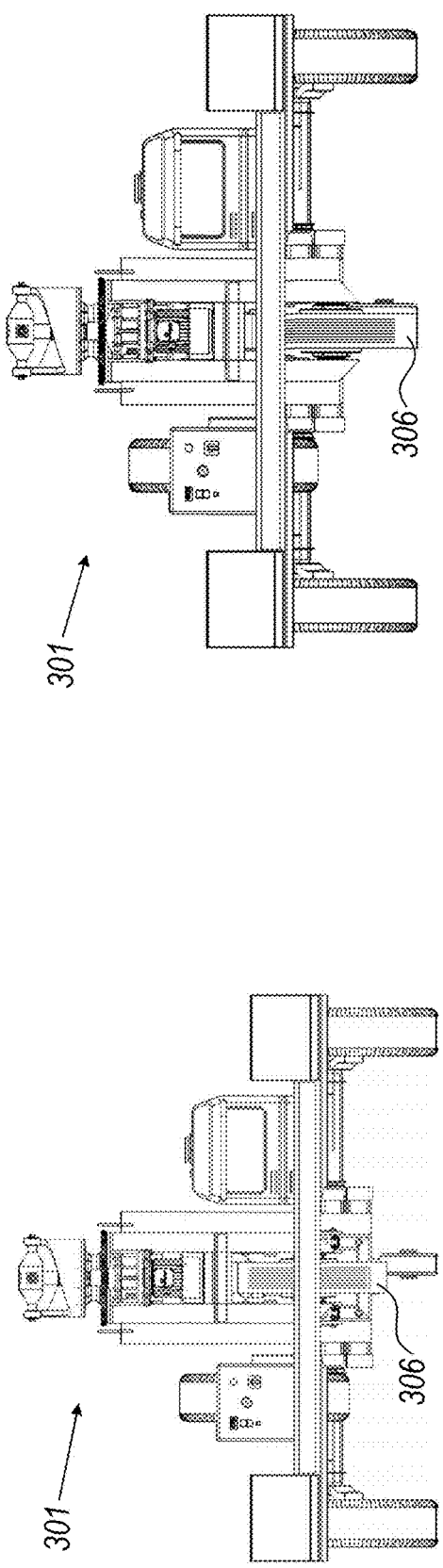
FIG. 3E
FIG. 3F
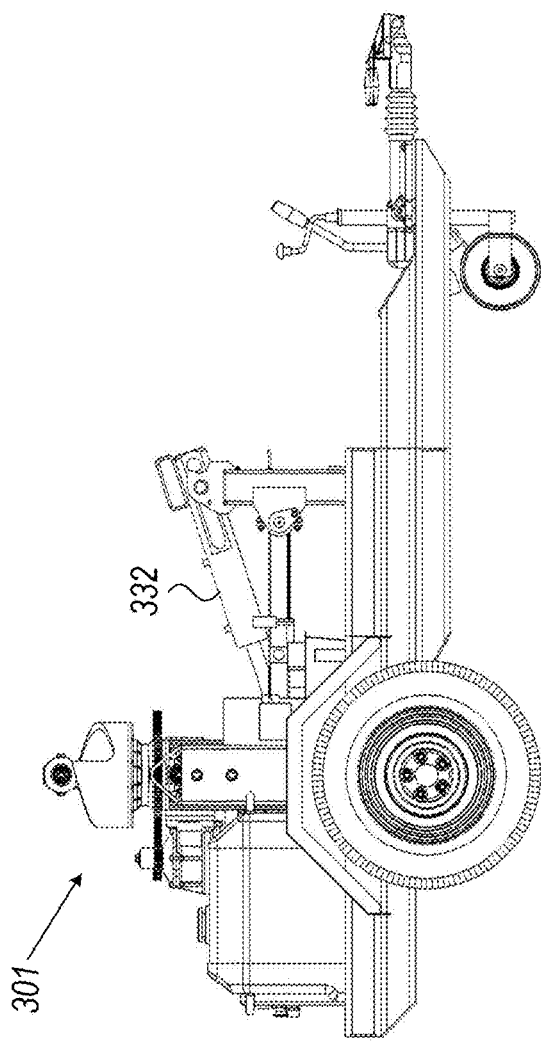
FIG. 3G

SEISMIC SOURCE FOR ON THE MOVE SEISMIC SURVEYING

FIELD OF THE DISCLOSED TECHNIQUE

The disclosed technique relates to seismic surveying in general, and to seismic sources in particular.

BACKGROUND OF THE DISCLOSED TECHNIQUE

Detecting underground objects is a challenge since such objects are not visible to the human eye. Such underground objects may also present a threat. Underground objects include, for example, buried rocks, underground cavities, air pockets, and archaeological artifacts (e.g., buried buildings, buried mills and the like). Underground objects may also be changes in ground composition which may pose a threat to heavy equipment and personnel, such as muddy terrain, swamps, quicksand and the like.

A known method for detecting underground objects is seismic mapping. In this method, devices known as geophones, which can detect and record seismic responses of the ground over time are positioned in the ground in an area of interest. Geophones are in general inserted into the ground and set up in an array format. One or more seismic sources are then used to generate seismic waves over a period of time in the area of interest. The seismic sources can be manually or hydraulically activated hammers. The seismic waves are substantially reflected and diffracted by objects, open spaces and general differences in ground composition. The geophones which were placed in the ground are synchronized with one another and detect the seismic responses of the area of interest based on the reflections and diffractions of the seismic waves received. Algorithms are then used to extract the underground structure of the area of interest as well as the presence and position of any objects or open spaces in the ground. These algorithms substantially reconstruct a map of the ground under the area of interest.

PCT Publication WO2013166046 to Eick et al, entitled "Alternative vibrator actuator source", directs to a vibratory seismic source for delivering acoustic energy into the earth. The acoustic energy is to be sensed by geophones for seismic prospecting. The source includes a plurality of linear motors arranged in a grid. Each linear motor includes a rod. Each rod is arranged to move vertically to contact the ground with a lower end of the rod. A control system controls the movement of the rods such that movement of the rods is synchronized with each other and the rods vibrate the ground and deliver acoustic energy thereto.

U.S. Patent Application Publication 2007/0235250 to Krumhansl et al, entitled "Seismic Source/Receiver Probe for Shallow Seismic Surveying" directs to a systems for evaluating underground structures and objects, particularly relatively shallow underground structures and objects, using a unitary apparatus including a seismic source and a receiver transducer within a common housing or frame. A unitary seismic probe includes a ground contacting structure that incorporates a wedge or a blade and an actuator attached to the ground contacting structure. The actuator includes a solenoid, a spring, a hammer and a stop structure attached to one end of the ground contacting structure. A Sensor is attached to the ground contacting structure at an opposite end. The probe assembly, functions to both generate a pressure wave into the ground, and to sense the ground for resulting wave motion. The probe is positioned such that the blade or wedge is in contact with the ground. With the solenoid de-energized, the spring lifts the hammer up. Once the solenoid is energized, the resulting magnetic field reacts with the hammer, forcing it down and compressing spring, until the end of the hammer strikes an anvil. The sensor measures the resulting vibrations in the soil.

U.S. Pat. No. 9,759,827 to Sallas et al, entitled "Device and Method for Continuous Data Acquisition" directs to a seismic source mounted on a truck, which includes a baseplate. The baseplate includes wheels for staying in contact with the ground while the truck moves along an acquisition line, so that the acoustic energy is continuously imparted to the ground. Sensors or receivers are used to record the reflected energy and may include hydrophones, geophones and/or accelerometers. Sallas et al directs to a method for separating source signal from received signal based, in part, on an optimal least square filter solution (e.g., Weiner-Kolmogorov filter) in the presence of white noise, applied in the frequency domain.

U.S. Pat. No. 3,676,841 to Anstey, entitled "Seismic Prospecting with a Continuous Seismic Source", directs to a continuous seismic source in the form of a drum being towed by a truck. The drum source is towed by a vehicle. Conventional detectors or geophones are disposed in an array and are interconnected by wires. The output from the array enters a signal-conditioning unit, which amplifies the signal. The signal is than transmitted by a radio transmitter which codes and modulates the signal. The signals transmitted from the several arrays are received in the towed vehicle by a receiver. These received signals are multiplexed and relayed to a base office. The signals received at the base office are correlated by a correlator, which multiplies each sample of the source signal by the corresponding sample of each array signal and by each of the following samples of each array signal, up to a limit incorporated in the device and representing the maximum seismic travel-time of interest.

US Patent Application No. 20052527 as well as U.S. Pat. Nos. 5,396,029 and 3,306,391 disclose systems for seismic investigations that are mounted on vehicles and are operable when the vehicles are not in motion.

U.S. Pat. No. 3,583,521 teaches a seismic unit that is operable when mounted on a moving vehicle. By the use of a collection of elements contained within a rolling drum, non-focused seismic waves may be generated.

SUMMARY OF THE PRESENT DISCLOSED TECHNIQUE

It is an object of the disclosed technique to provide a novel seismic source apparatus. In a first of its aspects, the invention provides a seismic source apparatus, configured to be maneuvered by a vehicle over a terrain and operable on the move, i.e., while the vehicle is in motion, said seismic source apparatus comprising:

a seismic source unit mounted on a source platform and configured to be maneuvered by the vehicle, the seismic source unit being configured to generate seismic waves while the vehicle is on the move, said seismic source unit including at least one movable mass and an energy transfer element configured to maintain continuous and intimate contact with the terrain while the vehicle is in motion and the seismic waves are generated;

at least one motion de-coupling assembly associating said energy transfer element with said source platform or vehicle, and provided to reduce or prevent vibrational energy generated by said seismic source unit to be transferred to the source platform or the vehicle, wherein motion of said seismic source unit while the vehicle is in motion or on the move, is independent of the motion of said vehicle and/or said source platform, wherein the motion of said seismic source unit is along or about at least one selected axis, within a determined range.

Also provided is a seismic source apparatus, configured to be maneuvered by a vehicle over a terrain and operable while in motion, said seismic source apparatus comprising:

a seismic source unit mounted on a source platform and configured to be maneuvered by the vehicle, the seismic source unit being configured to generate seismic waves while the vehicle is in motion, said seismic source unit including at least one movable mass and an energy transfer element configured to maintain continuous and intimate contact with the terrain while the vehicle is in motion and the seismic waves are generated;

at least one motion de-coupling assembly associating said energy transfer element with said source platform or vehicle, and provided to reduce or prevent vibrational energy generated by said seismic source unit to be transferred to the source platform or the vehicle, wherein the motion of said seismic source unit is along or about at least one selected axis, within a determined range, and wherein the seismic source unit is configured to have a substantially independent motion from motion of the vehicle and/or said source platform.

As disclosed herein, seismic surveying studies, method of seismic measurements or any other methods of the invention, as well as any of the apparatuses and systems of the invention are configured, operable and implemented to carry out the seismic investigation while the vehicle carrying the seismic source unit or a vehicle pushing or pulling a platform carrying the seismic source unit is on the move, namely is in motion. The terms suggest carrying out a seismic measurement while the vehicle carrying the seismic source unit is moving along a path on the terrain while the seismic waves are generated and the seismic measurement is carried out. Putting it differently, neither the vehicle nor the source platform is in a state of arrest or at a stationary status when the seismic waves are generated or detected.

Despite the vehicle or platform being on the move, the energy transfer element maintains a continuous and intimate contact with the terrain. In other words, the element remains in contact with the terrain throughout the travel route along which seismic waves are generated and detected. The expression "intimate contact" means a direct non-mediated contact between the outer surface of the energy transfer element, being in some embodiments a source drum, as defined, and a region of the terrain on which the element travels. An intimate contact is maintained despite holes or crevices or elevations or bumps and the like on which the element travels. To permit such a contact, the energy transfer unit is of a size that enables following the fine contour of the terrain. By utilizing an energy transfer element that maintains intimate contact with a region of the terrain, the present configuration of a system of the invention enables movement over the terrain that is uninterrupted while the seismic wave is generated and travels through the energy transfer element to the ground, permits for continuous generation and detection of seismic waves, and at the same time, effectively isolates the platform or vehicle from vibrations generated during seismic wave generation, by providing a decoupling assembly or elements that are provided between the energy transfer element and the platform or vehicle.

This unique configuration provides a seismic apparatus that is operable while the carrier vehicle is in motion.

As stated herein, the motion of the seismic source unit while the vehicle is in motion or on the move is said to be independent of the motion of said vehicle and/or said source platform. In other words, while the seismic source unit is pulled or pushed or otherwise carried by a moving vehicle or platform along a certain path and is therefore bound to the path traveled by the vehicle or platform, the seismic source unit has a degree of motion freedom to rotate about an axis, tilt, be raised or lowered to remain in contact with the retrain, all while moving along or about at least one selected axis, e.g., that is determined inter alia by the travel path of the vehicle or platform, within a predetermined range. As demonstrated in the figures, the energy transfer unit, being in some configuration a source drum, is coupled with the vehicle or platform and using the decoupling assembly to translate, rotate or both, about at least one of X, Y or Z axis of a reference coordinate system, at least within a selected or predetermined range (e.g., rotate within a range of angles, translate within a range of distances); thus exhibiting degrees of motion freedom from the vehicle and any unit mounted thereof.

In some configurations of an apparatus of the invention, the energy transfer element is a source drum, configured to translate, rotate or tilt while moving on the terrain.

As disclosed herein, the seismic source unit includes one or more masses (or weights), one or more masses, in a form of a double ended piston with the masses attached to ends thereof or in a form of an electromechanical unit. The double ended piston may be an hydraulic piston or a pneumatic piston.

In some embodiments, the seismic source unit includes a hammer and an anvil coupled with said energy transfer element, said hammer being configured to strike said anvil.

The hammer includes a hammer head and two track rollers mounted on a track rollers axis and over a camshaft, said anvil is coupled perpendicularly between support prongs which are coupled with said energy transfer element, said camshaft includes a sloped portion and an edged portion, and is further coupled perpendicularly between said support prongs, said camshaft is operable to rotate about a vertical axis relative to said support prongs, such that when in rotation, said track rollers roll-over said sloped portion and rise, thereby raising said hammer and said hammer head, wherein said track rollers reach over edge portion of said camshaft, said hammer drops and said hammer head strikes said anvil.

The motion de-coupling assembly may comprise a 4-link suspension. In some configurations, the motion de-coupling assembly includes at least one decoupling element selected from a 4-link suspension, a universal joint, a suspension piston and a push-pull spring.

In some embodiments, the source platform is a towed cart coupled with said vehicle via said motion de-coupling assembly. In some embodiments, the source platform is mounted on one of a manually maneuvered vehicle, a remotely maneuvered vehicle, a towed vehicle or cart and an independently maneuvered vehicle.

In another aspect of the technology disclosed herein there is provided a system comprising a vehicle or a moving platform, a seismic source apparatus according to the invention that is mounted on said platform or vehicle and one or more seismic detection unit.

The seismic detection unit may be any such detection unit known in the art. In some embodiments, the detection unit is or comprises a laser source. The laser source may be a multibeam source. In some embodiments, the laser source is or comprises a plurality of laser beams.

In some embodiments, the laser source is configured to illuminate an area of interest of the terrain. In some embodiments, the laser source directs a plurality of laser beams to generate an assemblage of laser spots on the area of interest.

Also provided is a method for generating a seismic map of a terrain region, the method comprising:
  maneuvering a seismic source unit mounted on a source platform over the terrain by a moving platform or a vehicle; said seismic source unit including at least one movable mass and an energy transfer element configured to maintain continuous and intimate contact with the terrain while the moving platform or vehicle is in motion;
  generating seismic waves in a direction substantially perpendicular to the terrain while the moving platform or vehicle is in motion, vibrational energy generated by said seismic source unit when waves are generated are substantially prevented from being transferred to the moving platform or the vehicle by at least one motion de-coupling assembly positioned between said energy transfer element and said moving platform or vehicle;
  detecting and optionally recording seismic responses received from the terrain over a period of time; and
  determining underground structure of the terrain to provide the seismic map.

As known in the art, a seismic map or seismic data refers to information relating to the amplitude, frequency and phase of a seismic wave, which propagates through a region of interest, as manifested by vibrations in the region of interest, and specifically of tilt vibrations, as a function of distance from a detector and time. The system of the invention enables to remotely generate a seismic map for a region of interest without an imager being in physical contact with the ground at the region of interest. The seismic map may be a single point, a 1D map or a 2D map of the region of interest and can be employed to detect underground objects.

In some embodiments, the detection unit is or comprises a laser source as disclosed herein. The laser source may be a multibeam source. In some embodiments, the laser source is or comprises a plurality of laser beams.

In some embodiments, the laser source is configured to illuminate an area of interest of the terrain. In some embodiments, the laser source directs a plurality of laser beams to generate an assemblage of laser spots on the area of interest.

In methods of the invention, the step of detecting comprises detecting of seismic waves that are reflected or diffracted or by detecting a seismic interaction of the seismic waves with by objects, open spaces and modulations in ground composition.

Further provided is a motion decoupling assembly for use in a seismic source apparatus comprising a seismic source unit and a seismic detection unit, the motion decoupling assembly comprising one or more decoupling elements associating said seismic source unit to a moving platform or vehicle carrying said seismic detection unit, wherein the motion decoupling assembly is configured to isolate said seismic detection unit from vibrational energy generated by said seismic source unit, The assembly may be such that the one or more decoupling elements are selected from a 4-link suspension, a universal joint, a suspension piston and a push-pull spring.

Embodiments, descriptors and embodiments of the above are further provided below and are generic and encompass other configurations and permutations which enable apparatuses, systems and methods of the invention.

BRIEF DESCRIPTION OF THE DRAWINGS

The disclosed technique will be understood and appreciated more fully from the following detailed description taken in conjunction with the drawings in which:
FIGS. 2A, 2B, 2C and 2D which are schematic illustration of a portion of an exemplary seismic source unit, constructed and operative in accordance with another embodiment of the disclosed technique;
FIGS. 3A-3G are schematic illustrations of yet another exemplary seismic source apparatus, constructed and operative in accordance with another embodiment of the disclosed technique.

DETAILED DESCRIPTION OF THE EMBODIMENTS

Figure 1:
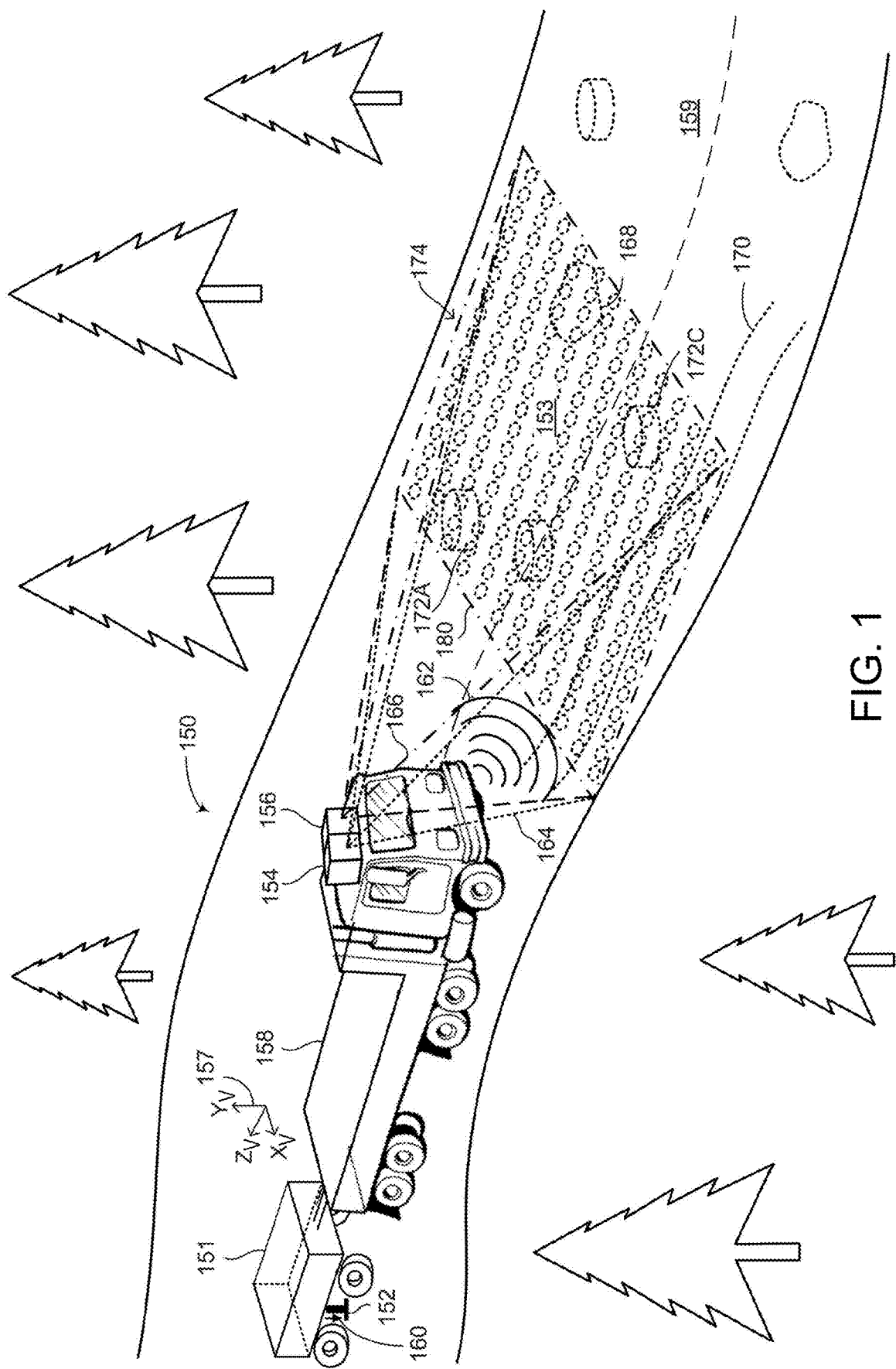
FIG. 1 is schematic illustration of an exemplary seismic surveying system employed to detect and image underground objects, constructed and operative in accordance with another embodiment of the disclosed technique.

The disclosed technique overcomes the disadvantages of the prior art by providing a seismic source apparatus which includes a seismic source unit. The seismic source is mounted on a source platform, which is maneuvered over terrain. For example, the source platform is maneuvered (e.g., towed, pushed or side pushed) by a vehicle, where the vehicle may include a seismic surveying system. Alternatively, the source platform unit independently maneuvers over the terrain, for example, the source platform is mounted on a manually maneuvered vehicle, a remotely maneuvered vehicle or an independently maneuvered (e.g. robotic) vehicle. In general, seismic source units include an energy transferring element, such as a hammer face, a rolling drum or a platform, and a seismic energy source such as a movable mass or an ultrasound transducer.

The movable mass may be defined as an object, one, or more, having a predefined mass, which is positioned within the seismic source unit, and may apply force due its mass and/or motion, directly, or indirectly, on an energy transfer element. The moveable mass may apply force, thus, transferring energy, to the energy transfer element continuously, or along predefined intervals (e.g. defined in advance, or on spot decisions).

The energy transfer element is an element that may be configured from one, or a plurality of subsections, which are configured to receive the energy received from the moveable mass (one, or more), and subsequently transfer the energy received, or part thereof, by applying the force on the terrain. The energy transfer element transfers the energy produced by the seismic source unit to the ground. In operation, when the seismic source unit transfers energy to the ground, the seismic source apparatus generates mechanical vibrations and motions. These mechanical vibrations and motions may be transferred to the source platform. Accordingly, when the source platform is maneuvered by a vehicle, which includes a seismic surveying system, these mechanical vibrations and motions may be transferred to the vehicle and thus to the seismic surveying system. Consequently, they may hinder the detection of seismic waves. To maximize the transfer of energy to the ground, the energy transferring element should be in continuous contact with the ground, regardless of the terrain (e.g., holes, crevices, elevations and the like) over which the source moves.

A seismic source apparatus configured to be maneuvered by a vehicle over terrain according to the disclosed techniques includes at least one seismic source unit mounted on a source platform, the seismic source unit is configured to generate seismic waves, and comprises at least one motion de-coupling assembly, which is provided to reduce or prevent vibrational energy generated by the seismic source unit to be transferred to the source platform, and wherein the at least one motion de-coupling assembly is configured to enable motion of said seismic source unit while the vehicle is in motion or on the move, independent of the motion of said vehicle, said source platform, or both, along and/or about at least one axis, at least within a determined range.

As used herein, the vibrational energy is generated by way of vibrations formed due to the operation of the seismic source unit and which are typically directed at all directions, including at the direction of the platform or vehicle on which a detection unit is mounted. Thus to reduce, minimize or prevent the vibrations or vibrational energy from reaching the detection unit, decoupling assemblies or decoupling elements are used. By placing the decoupling elements at specific regions of a system of the invention, as defined, the detection unit is shielded or isolated from such traveling vibrations, enabling continuous and uninterrupted detection of the seismic waves.

As further elaborated below, a motion de-coupling assembly may be implemented, for example, with a parallel 4-link suspension, a spring, a suspension piston, a rotary joint, a universal joint, a bellow joint, a bearing or a hinge. Thus, while the seismic source apparatus is mechanically maneuvered over the terrain, the seismic source unit is in continuous contact with the ground, with degrees of motion freedom relative to the source platform or vehicle. Consequently, transfer of mechanical vibrations and motions from the seismic source unit to the source platform, or vehicle and to the seismic surveying system mounted thereon, is reduced or prevented.

It is noted that a seismic source apparatus according to the present invention may be included in a system comprising a seismic detection unit, and the seismic detection unit which may be a laser source, an array of lasers or any other detection means as known in the art.

Reference is now made to FIG. 1, which is a schematic illustration of an exemplary seismic surveying system, generally referenced 150, employed to detect and image underground objects, constructed and operative in accordance with another embodiment of the disclosed technique. FIG. 1 depicts a typical scenario in which a system according to the disclosed technique is employed. System 150 includes a seismic source unit 152, a multibeam laser source 154 and an imager 156. Multibeam laser source 154 and imager 156 are mounted on vehicle 158 and seismic source unit 152 is mounted on a cart 151 (i.e., the source platform is a cart), which is towed by vehicle 158. Multibeam laser source 154 and imager 156 may be mounted on a controlled gimbal on vehicle 158 (e.g., on a mast attached to vehicle 158) such that the multibeam laser source 154 and imager 156 may be directed toward a selected azimuth and elevation directions. Vehicle 158 is associated with a reference coordinate system 157.

In some embodiments, the detection unit used in systems of the invention is or comprises a laser source which may generate a single beam or a multibeam that is directed at various points of an area of the terrain to be surveyed. In some embodiments, the laser source is configured to illuminate an area of interest of the terrain. In some embodiments, the laser source is or comprises a plurality of laser beams. Irrespective of the form or selection of laser sources used, the laser source is configured and operable to direct a plurality of laser beams to generate an assemblage of laser spots on the area of interest.

In some embodiments, the laser source is a multibeam laser source. A multibeam laser source may any such source known in the art. An exemplary multibeam source is subject of International Patent Application No. WO2021/028905, or any US counterpart or national phase application thereof, each of which being herein incorporated by reference.

In FIG. 1, seismic source unit 152 is depicted as being mounted on a cart 151 being towed by vehicle 158. It is noted that this is an example only, which is brought herein for explanatory purposes only. In general, the seismic source unit 152 may be maneuvered (e.g., towed, pushed or side pushed) by vehicle 158.

In operation, vehicle 158 drives or is maneuvered along a road 159. As shown in FIG. 1, ground 153 includes a plurality of underground objects such as a rock 168, an ancient wall 170 and a plurality of rocks 172A, 172B and 172C. As vehicle 158 drives along the road 159, the seismic source unit 152 generates at least one seismic wave 162 in the ground 153. Seismic wave 162 propagates in the ground 153, including an instantaneous area of interest 180. The multibeam laser source 154 illuminates an instantaneous area of interest 180 by directing a plurality of laser beams to generate an assemblage of laser spots (not labeled in FIG. 1). The assemblage of laser spots covers (i.e., at least substantially) the surface of the instantaneous area of interest 180 as demarcated by a set of dotted lines 164. System 150 scans the area of interest with laser spot assemblage as the vehicle 158 progresses along the road 159. As the vehicle 158 progresses along the road 159, imager 156 receives speckle patterns corresponding to each laser spot in the assemblage of laser spots as demarcated by a set of dotted lines 166 and acquires a defocused image of the received speckle patterns. The general configuration of the multibeam laser source 154 and the imager 156 can be referred to as an optical geophone array which is capable of detecting the presence of seismic waves at a very high resolution and sensitivity. This in turn enables the system 150 depicted in FIG. 1 to be used in real-time seismic surveying.

As mentioned above, the seismic source unit 152 is mechanically maneuvered by the vehicle 158. According to the disclosed technique, the seismic source and vehicle 158 exhibit degrees of motion freedom therebetween, such that the vibrations and motions induced on the multibeam laser source 154 and imager 156 by the seismic source unit 152 are reduced (e.g., relative for to the vibrations and motion induced when seismic source is mounted on vehicle 158 or when no such degrees of motion freedom exist) or prevented. As further elaborated below, the seismic source unit 152 includes a source drum. The source drum is coupled with cart 151 such that the source drum is able using a de-coupling assembly (not shown) to either translate, rotate or both, about at least one of Xv, Yv or Zv axis of a reference coordinate system 157, at least within a selected or predetermined range (e.g., rotate within a range of angles, translate within a range of distances). Thus, the source drum exhibits degrees of motion freedom from the vehicle 158, and thus from the multibeam laser source 154 and the imager 156.

Figure 2C:
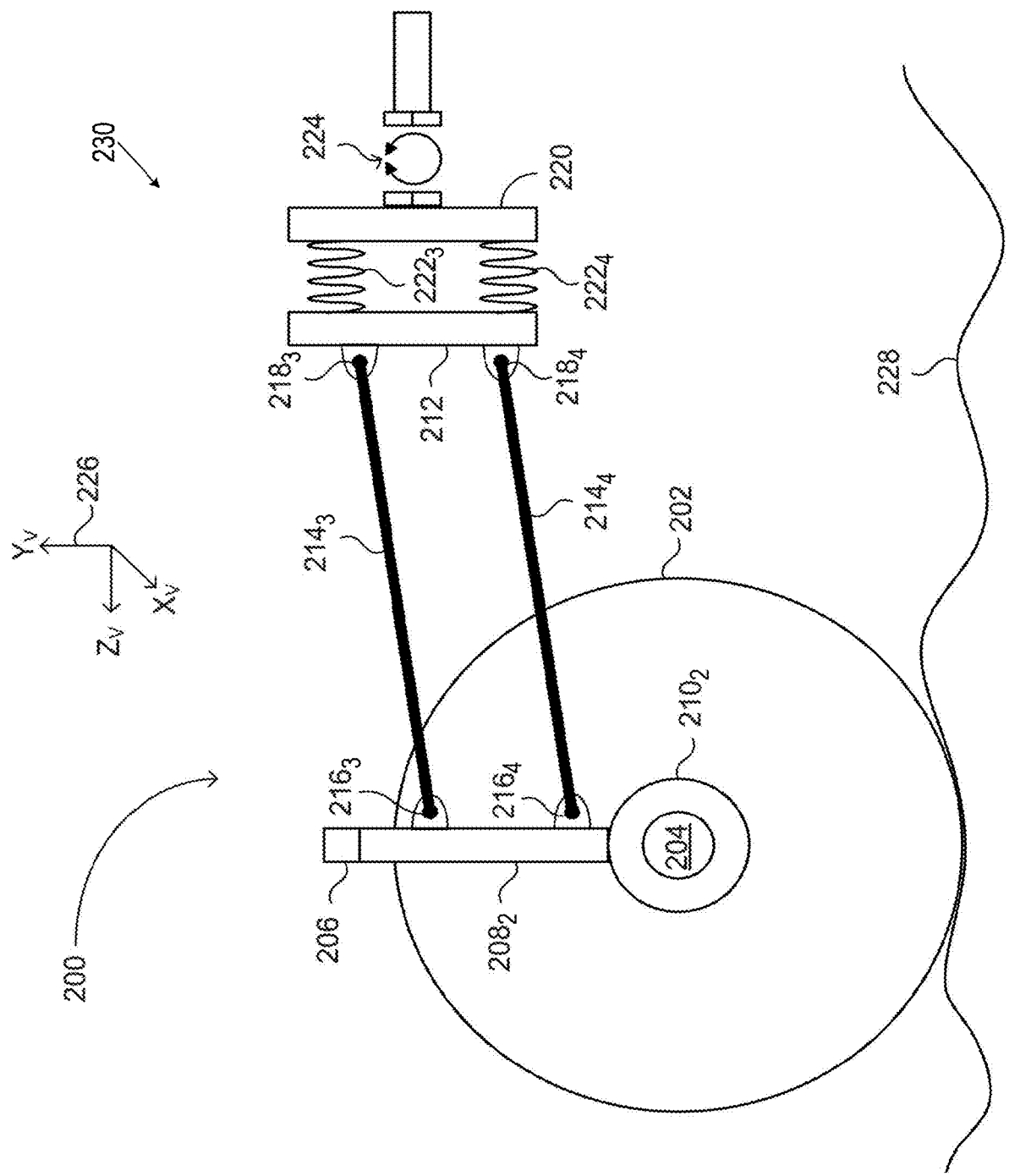

Reference is now made to FIGS. 2A, 2B and 2C which are schematic illustration of a portion of an exemplary seismic source apparatus, generally referenced 200, constructed and operative in accordance with another embodiment of the disclosed technique. It is noted that only a portion of seismic source apparatus 200 is depicted in FIGS. 2A and 2B for clarity of the figures and the explanations. Seismic source apparatus 200 may be employed in any scenario described herein above, for example in conjunction with FIG. 1 or when the seismic source apparatus is mounted on a vehicle.

In seismic source apparatus 200, the energy transfer element comprises a source drum 202 associated with axis of rotation 204, anvil bridge 206, support prongs $208_1$ and $208_2$ and a rotational bearing 210. The seismic source apparatus 200 comprises also a de-coupling assembly 230 comprising bars $214_1$, $214_2$, $214_3$, $214_4$, springs $222_1$, $222_2$, $222_3$, $222_4$, and rotary joint 224. In some embodiments, the assembly need not include multiple decoupling elements such as bars, springs and rotary joints. In such elements, the decoupling assembly may include one or more decoupling elements, provided that the decoupling element(s) present are sufficient to reduce or prevent vibrational energy from reaching the vehicle or platform, as disclosed herein.

FIGS. 2A, 2B and 2C do not show a source platform, a moveable mass, or a vehicle.

The source drum 202 (shown in the figures in a shape of a moving wheel or a rolling drum) is configured to roll about an axis of rotation 204. The anvil bridge 206 is coupled with axis of rotation 204 via support prongs $208_1$ and $208_2$ and a rotational bearing 210 (e.g., a ball bearing).

Support prongs $208_1$ and $208_2$ are adjoined to de-coupling assembly 230, thus, support prongs $208_1$ and $208_2$ are coupled with plate 212 by a parallel 4-link suspension comprising. the parallel 4-link suspension bars $214_1$, $214_2$, $214_3$, $214_4$. Bar $214_1$ is coupled with support prong $208_1$ by hinge $216_1$ and with plate 212 by hinge $218_1$. Bar $214_2$ is coupled with support prong $202_1$ by hinge $216_2$ and with plate 212 by hinge $218_2$. Bar $214_3$ is coupled with support prong $208_2$ by hinge $216_3$ and to plate 212 by hinge $218_3$. Bar $214_4$ is coupled with support prong $208_2$ by hinge $216_4$ and to plate 212 by hinge $218_4$. Consequently, the seismic source apparatus 200 is free to vertically move along the Yv axis of coordinate system 226. The seismic source apparatus 200 further includes plate 220, coupled with plate 212 via springs $222_1$, $222_2$, $222_3$, $222_4$. Springs $222_1$, $222_2$, $222_3$, $222_4$ enable seismic source apparatus 200 to vertically move along the Zv axis of coordinate system 226, as well as to rotate about the Xv axis and the Yv axis. A rotary joint 224 is coupled with plate 220, thus enabling seismic source apparatus 200 to rotate about the Zv axis of coordinate system 226. Coordinate system 226 is associated with either a vehicle or a source platform.

As noted above, de-coupling assembly 230, includes three motion and vibration de-coupling elements, namely the 4-link parallel suspension, springs $222_1$, $222_2$, $222_3$, $222_4$ and rotary joint 224. In operation, the seismic source apparatus 200 is maneuvered (e.g., by vehicle 158—FIG. 1) over terrain 228. Terrain 228 may be uneven and include holes, crevices, elevations bumps and the like. However, as described above, the seismic source is free to move along and rotate about the axes of coordinate system 226 while maintaining intimate contact with the terrain. For example, the parallel 4-link suspension enables source drum 202 to move up and down when source drum 202 moves over a bump or a crevice. Thus, the source drum 202 remains in contact with the terrain 228. To generate a seismic wave in the ground, while the source drum 202 is in contact with the terrain and while the vehicle is in maneuver, the hammer (not shown) strikes the anvil bridge 206, which transfers the energy from the hammer strike, via the support prongs $208_1$ and $208_2$, to the axis of rotation 204, the source drum 202 to the terrain 228. In other words, the source drum 202 couples the energy produced by the hammer strike to the terrain 228. Due to the de-coupling assembly 230, during the strike of the hammer, the seismic source apparatus 200 may come to a temporary halt, while the vehicle or the source platform maneuvering the seismic source apparatus 200 remain in motion. For example, a strike of the hammer can last 2 milliseconds (hereafter, "ms"). When the seismic source apparatus 200 moves at a velocity of 6 meters per second (m/s), the source platform or the vehicle continues to move for about 12 millimeters (mm) while the energy transfer element of the seismic source apparatus 200 is stationary. The ability of the energy transfer element of seismic source apparatus 200 to move along and rotate about the axes Xv, Yv and Zv of coordinate system 226, reduces the motion and vibrations transferred from the energy transfer element of the seismic source apparatus 200 to the vehicle or the source platform. Accordingly, de-coupling assembly 230 reduces or prevents vibrational energy further transferring through assembly 230, e.g. to a source platform or the vehicle comprising the seismic source apparatus 200. Furthermore, the de-coupling assembly 230 sufficiently reduces or prevents vibration energy and motion from vehicle or source platform. Furthermore, the de-coupling assembly 230 ensures that the energy transfer element of the seismic source apparatus 200 motion and vibration is independent of the motion of said vehicle and/or said source platform. Consequently, in case the seismic source is maneuvered by a vehicle mounted with the seismic surveying system, the vibrations and motions transferred to the seismic surveying system are reduced or even prevented. This permits the seismic source unit to generate seismic waves in a direction substantially perpendicular to the terrain required for surveying a terrain.

Figure 2D:
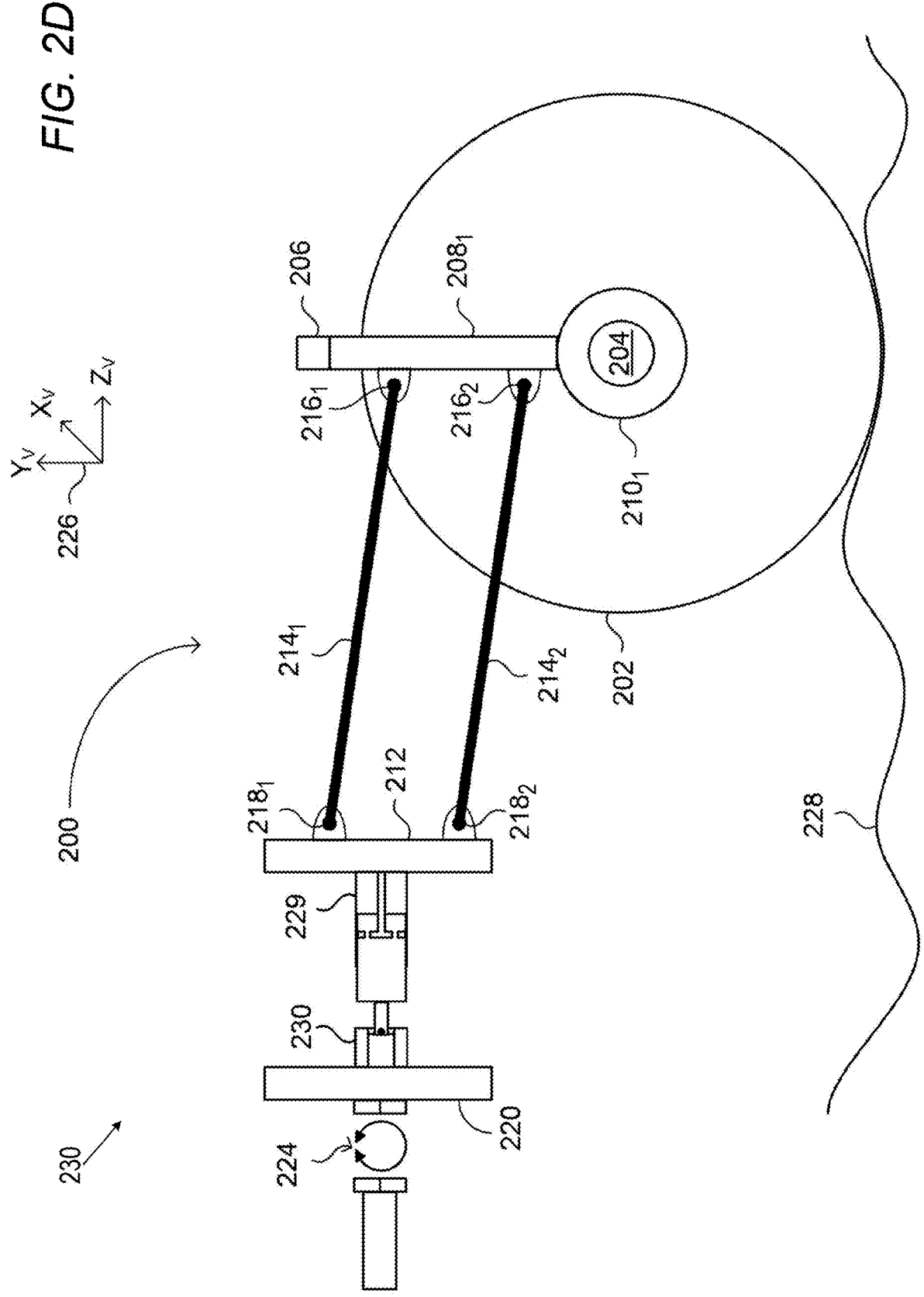

With reference to FIG. 2D, depicted therein is an alternative to springs $222_1$, $222_2$, $222_3$, $222_4$. In FIG. 2D, springs $222_1$, $222_2$, $222_3$, $222_4$ are replaced with a suspension piston 229 and a universal joint 230. Suspension piston 229 enable seismic source apparatus 200 to vertically move along the Zv axis of coordinate system 226, while universal joint 230 enables seismic source apparatus 200 to rotate about the Xv axis and the Yv axis.

Reference is now made to FIGS. 3A-3G, which are schematic illustrations of yet another exemplary seismic source apparatus generally referenced 300, constructed and operative in accordance with another embodiment of the disclosed technique. The seismic source apparatus 300 may be employed in any scenario described herein above, for example in conjunction with FIG. 1 or when the seismic source apparatus is mounted on a vehicle and may employ the principles described herein above in conjunction with FIGS. 2A-2D or in any other manner (e.g. when mounted on a platform positioned in front of a vehicle, or in the center of the vehicle, or by any other configuration wherein the apparatus maneuvered by a vehicle).

In seismic source apparatus 300, the movable mass of the seismic source includes a hammer and an anvil as elaborated below, and the energy transfer element is a source drum also as elaborated below. The seismic source apparatus 300 includes a seismic source unit 301 coupled with a towed cart 302 (i.e., towed cart 302 is the source platform), such that the seismic source unit 301 is able to either translate, rotate or both, relative to either a vehicle or towed cart 302 or both i.e., about at least one of Xv, Yv or Zv axis of a reference coordinate system 303. The seismic source unit 301 comprises, an energy transfer element which comprises, a source drum 306, axis of rotation 322, two vertical support prongs $308_1$ and $308_2$, and an anvil 310, a moveable mass which comprises hammer 312; and camshaft 314. Hammer 312 comprises hammer head 316 and two track rollers $318_1$ and $318_2$ mounted on a track rollers axis 320 and over camshaft 314. Anvil 310 is coupled perpendicularly between vertical support prongs $308_1$ and $308_2$. Camshaft 314 includes a sloped portion 326 and an edged portion 328, and is also coupled perpendicularly between vertical support prongs $308_1$ and $308_2$ and at the upper part thereof. Camshaft 314 is further operable to rotate about a vertical axis relative to vertical support prongs $308_1$ and $308_2$. Vertical support prongs $308_1$ and $308_2$ are further coupled with axis of rotation 322 of source drum 306 via axis rotational bearings. As shall be further elaborated below in conjunction with FIGS. 3F and 3G, seismic source 301 may be positioned in two configurations, a deployed configuration or a transport configuration. For the sake of the clarity of the description, FIGS. 3A-3E depict seismic source apparatus 300 in the transport configuration.

In operation, a motor 324 rotates camshaft 314, (i.e., either directly or via gears). As track rollers $318_1$ and $318_2$ roll over the sloped portion 326 of camshaft 314, track rollers $318_1$ and $318_2$ rise, thereby raising hammer 312 (i.e., via track rollers axis 320) and hammer head 316. When track rollers $318_1$ and $318_2$ reach over edge portion 328 of camshaft 314, hammer 312 drops, and hammer head 316 strikes anvil 310. This strike is referred to herein as a main strike. As can be understood, the time span of the main strike is very short (e.g. 0.1-20 milliseconds; 0.5-15 ms; 1-10 ms; 2-6 ms; 1-3 ms; 1.5-2.5 ms). Anvil 310 transfers the energy from the hammer strike, via vertical support prongs $308_1$ and $308_2$, to axis of rotation 322, source drum 306 and to the terrain on which source drum 306 rolls. In other words, source drum 306 couples the energy produced by the strike of hammer 312 to the terrain, via anvil 310, vertical support prongs $308_1$ and $308_2$ and axis of rotation 322. Seismic source 301 may further include a spring to aid in accelerating hammer head 316 toward anvil 310. It is noted that sloped portion 326 aids in preventing a secondary strike of hammer head 316 on anvil 310. A secondary strike occurs after a main strike due to energy reflected from the ground back toward anvil 310. This reflected energy cause hammer 312 to rise again. During the time period between a main strike and a secondary strike, camshaft 314 continues to rotate. If a secondary strike occurs, track rollers $318_1$ and $318_2$ shall be stopped by a section of sloped portion 326, higher than the section to which track rollers $318_1$ and $318_2$ fell during the main strike. As a result, hammer head 316 is stopped before it hits anvil 310 again.

Seismic source apparatus 300 comprises further a de-coupling assembly 350. Seismic source unit 301 is coupled with towed cart 302 via with de-coupling assembly 350. De-coupling assembly 350 comprises the following elements, an arrangement of parallel 4-link suspension bars, a harnessing frame 304, and a push-pull spring 334. The Parallel 4-link suspension includes four bars $330_1$, $330_2$, $330_3$ and $330_4$ and a hydraulic arm 332. Bar $330_1$ is coupled with support prong $308_1$ and harnessing frame 304 by respective hinges. Bar $330_2$ is coupled with support prong $308_1$ and with harnessing frame 304 by respective hinges. Bar $330_3$ is coupled with support prong $308_2$ and with harnessing frame 304 by respective hinges. Bar $330_4$ is coupled with vertical support prong $308_2$ and with harnessing frame 304 by respective. Consequently, seismic source unit 301 is free to vertically move along the Yv axis of the reference coordinate system 303. Also, hydraulic arm 332 is coupled with harnessing frame 304 and with vertical support prongs $308_1$ and $308_2$ via respective hinges. It is noted that hydraulic arm 332, bars $330_1$ and $330_3$, and bars $330_2$ and $330_4$ are couple with harnessing frame 304 at different respective vertical positions.

Also, towed cart 302 includes a push-pull spring 334. Push-pull spring 334 enables towed cart 302, and thus seismic source unit 301 mounted thereon, to temporarily come to a stop when hammer 312 strikes source drum 306, while the vehicle continues the motion thereof. In other words, push-pull spring 334 enables towed cart 302 (and thus seismic source unit 301 mounted thereon), and the vehicle to substantially independent move one with respect to the other along the Zv axis of reference coordinate system 303 as well as to rotate one with respect to the other about the Yv axis of reference coordinate system 303. Thus to the configuration of de-coupling assembly 350 The ability of seismic source unit 301 to move along and rotate about the axes Xv, Yv and Zv of reference coordinate system 303, reduces and/or prevents the motion and vibrational energy transferred to the vehicle from seismic source apparatus 300 in general, and due to rough terrain and hammer strikes in particular, and also enables source drum 306 to remain coupled with the terrain. Furthermore, during the main strike the de-coupling assembly 350 reduces and/or prevents transferring motion and vibrational energy due to a motion of vehicle associated with towed cart 302 through push-pull spring 334.

De-coupling assembly 350 comprises two motion and vibrational energy de-coupling elements, namely an arrangement of 4-link parallel suspension bars, and push-pull spring 334. For example, seismic source apparatus 300 is maneuvered by a vehicle (e.g., vehicle 158—FIG. 1) over terrain. Terrain may be uneven and include holes, crevices, elevations bumps and the like. However, as described above, seismic source unit 301 is free to move along and rotate about the axes of reference coordinate system 303. For example, the parallel 4-link suspension bars enables source drum 306 to move up and down when source drum 306 moves over a bump or a crevice. Weights, such as weights $309_1$ and $309_1$ coupled with the vertical support prongs $308_1$ and $308_1$ respectively, push down on source drum 306 such that source drum 306 remains coupled with the terrain.

Figure 3A:
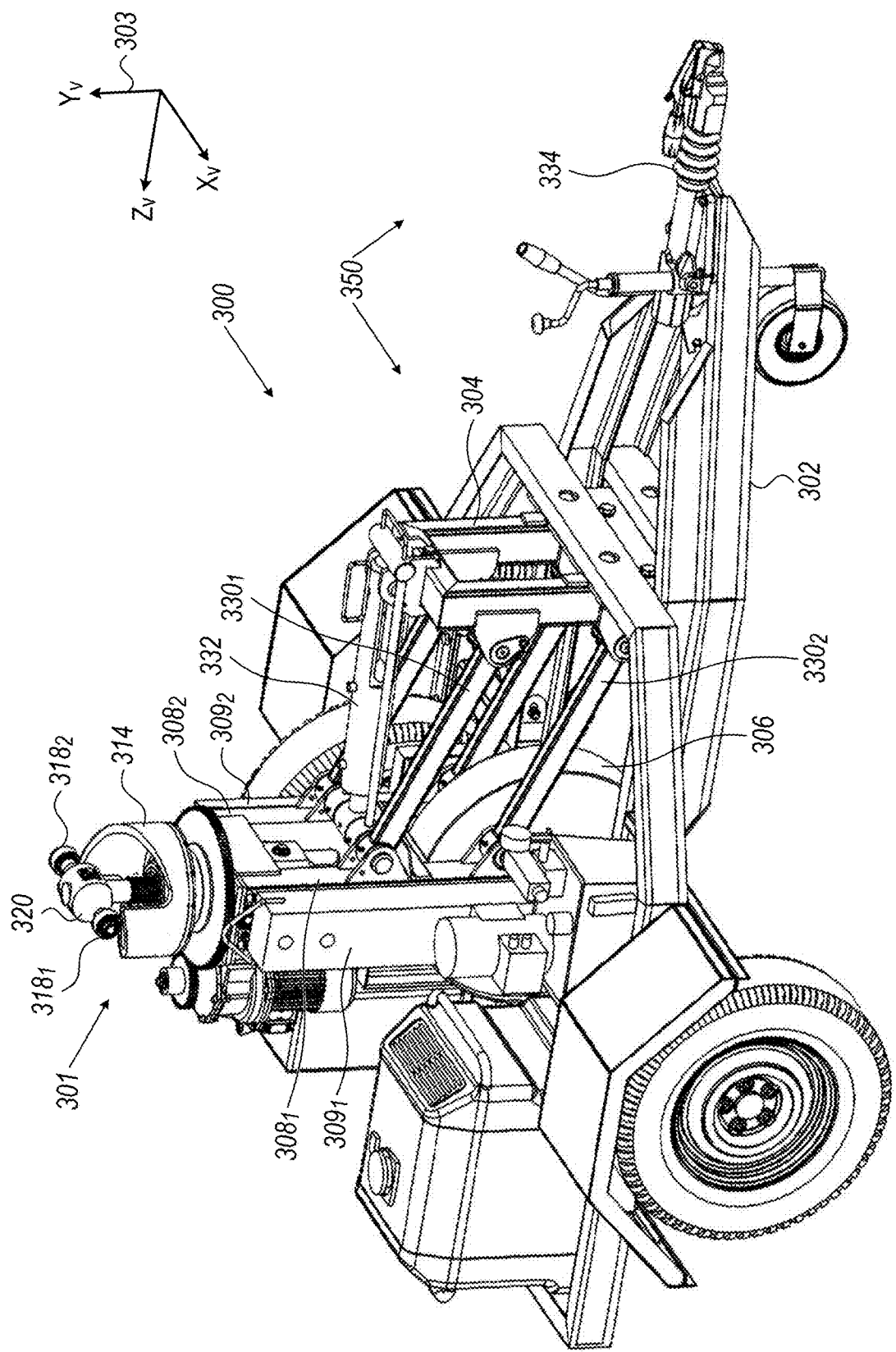
Figure 3B:
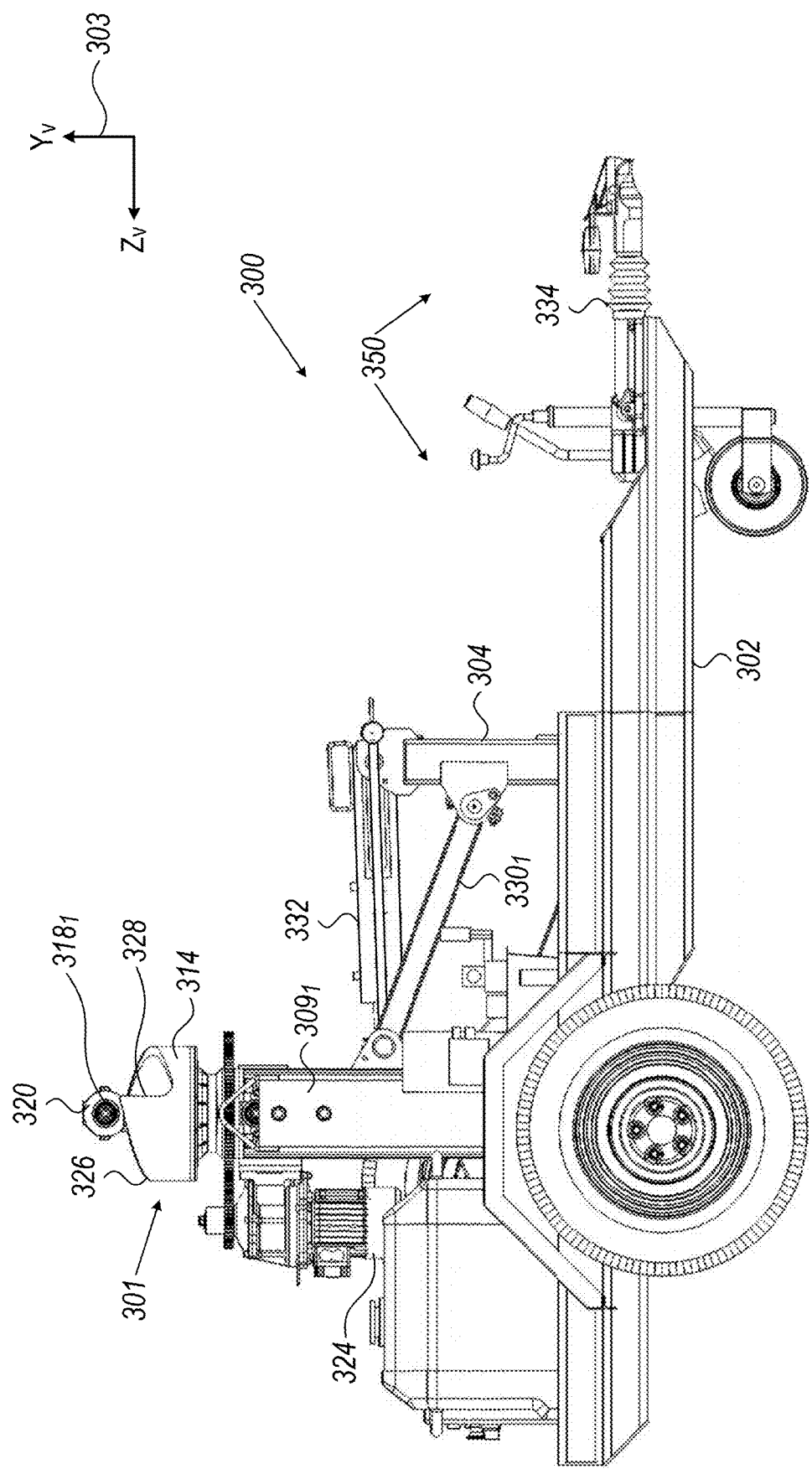
Figure 3C:
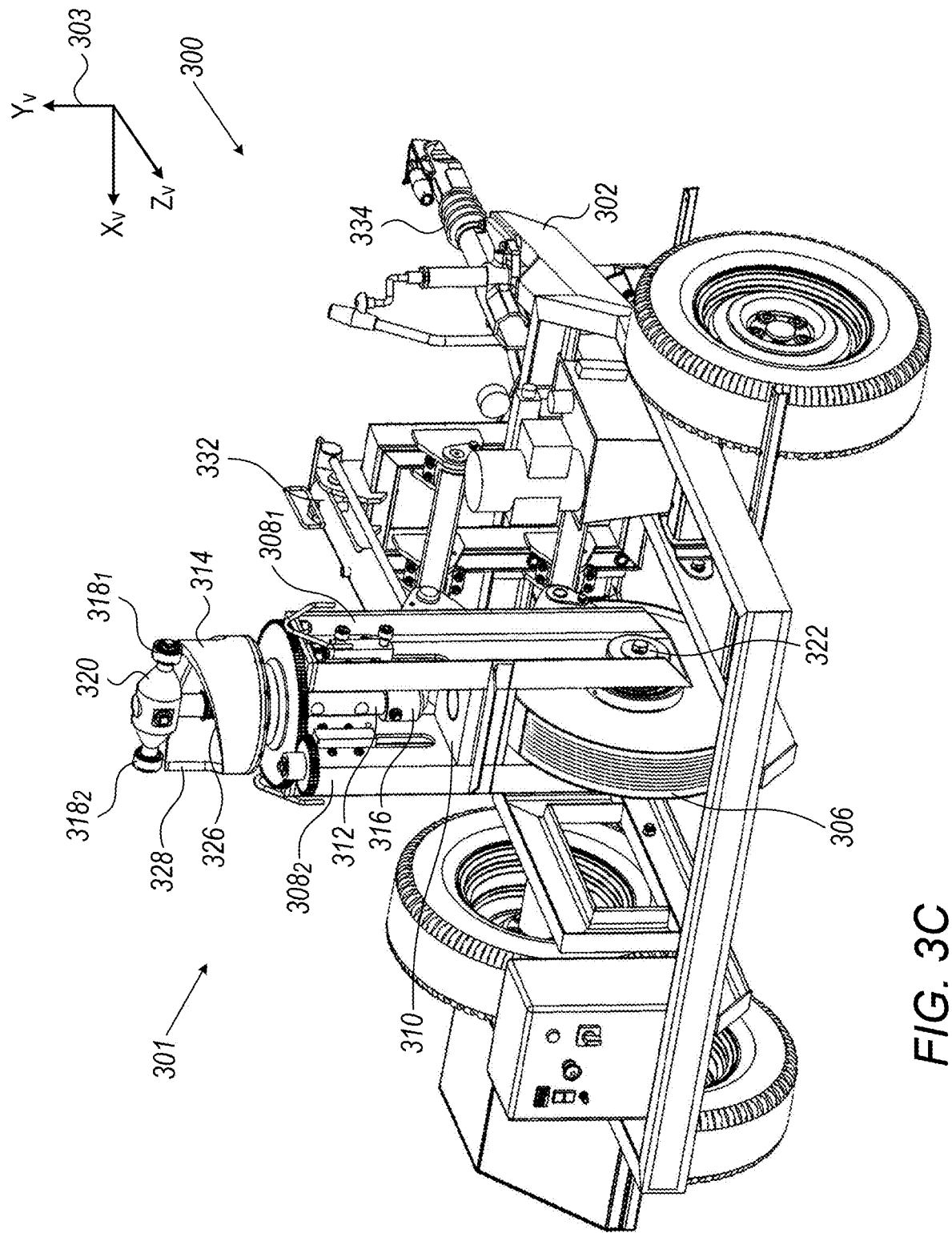
Figure 3D:
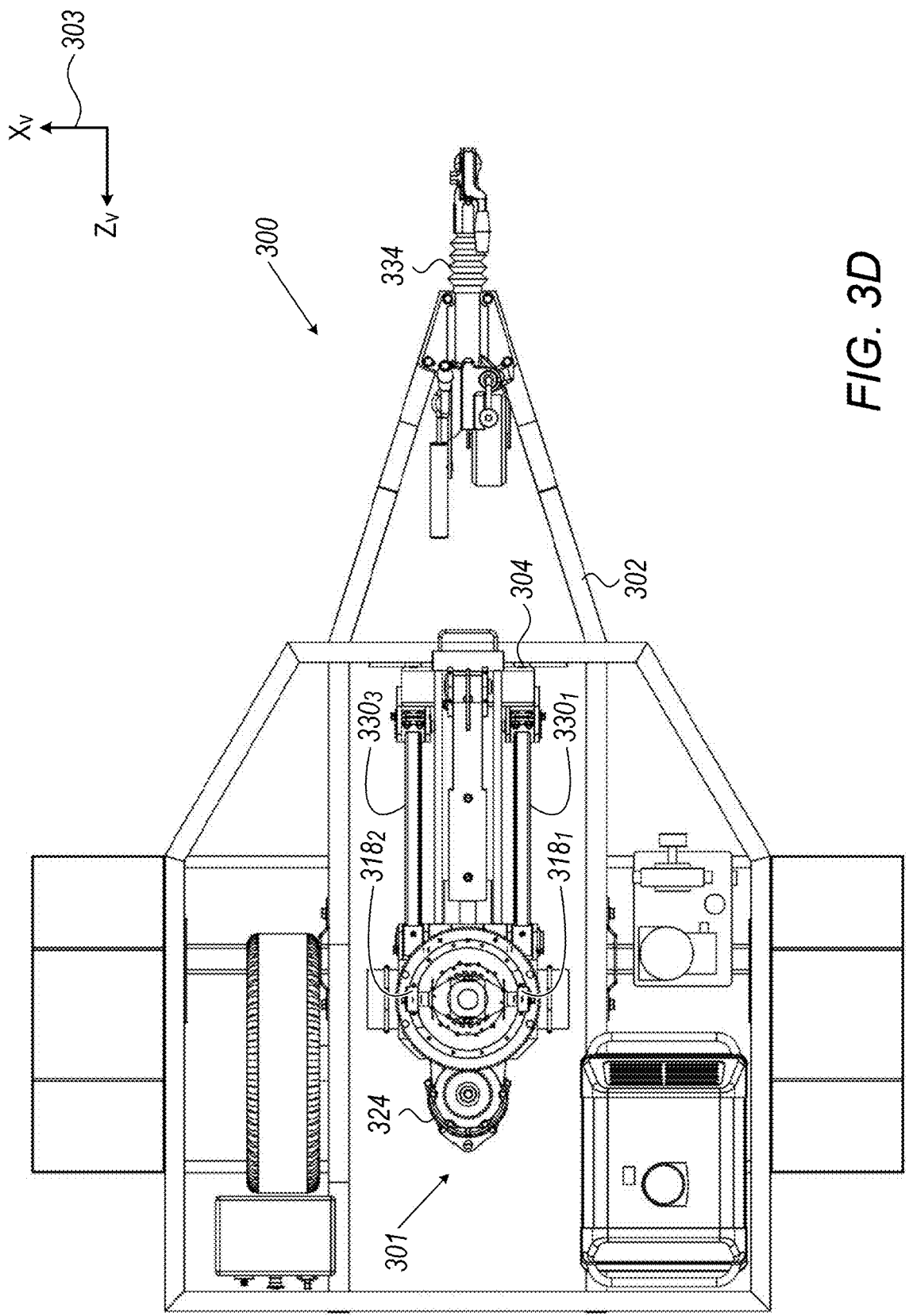

As mentioned above, FIGS. 3A-3E depict seismic source unit 301 in the transport configuration. In the transport configuration, hydraulic arm 332 pulls seismic source unit 301 and thus source drum 306 such that source drum 306 is not coupled with the ground. With reference to FIGS. 3F and 3G, seismic source unit 301 is depicted therein in the deployed configuration. In the deployed configuration, hydraulic arm 332 lowers seismic source unit 301 and thus source drum 306 until source drum 306 is coupled with the ground.

The above examples brought forth in conjunction with FIGS. 1, 2A-2D, and 3A-3G, describe several solutions to maintain a mechanical coupling of the seismic source to the ground as well as to decouple the motion of the seismic source from the source platform and/or from a vehicle maneuvering the seismic source. In general, a seismic source apparatus according to the disclosed technique requires a de-coupling assembly decoupling in at least two axes, the vertical axis (Yv) and the longitudinal axis (Zv) of vehicle reference coordinate system. To that end, and in general, a seismic source apparatus includes a de-coupling assembly comprising at least one motion and vibrational energy de-coupler element. A motion and/or vibrational energy de-coupler enables motion of the seismic source along and/or about at least one axis, at least within a determined range. As described above, a motion de-coupler may be implemented, for example, with a parallel 4-link suspension, a spring, a suspension piston, a rotary joint, a universal joint, a bellow joint, a bearing or a hinge.

The hammer, anvil and source drum implementation brought forth in conjunction with FIGS. 2A-2C and 3A-3G describes one example of a seismic source units in accordance with the disclosed technique. Another example, typically employed for generating high frequency seismic waves, may be a hydraulic piston mounted within the drum, for example, coupled with the axis of the drum. Also, the width of the drum may be selected based on various operation parameters. For example, the wider the drum wheel, the better are the road and off-road capabilities and the better the frequency coupling with the ground (i.e., the ration between the energy produced by the source and the energy transferred to the ground for frequencies generated by the source). However, maneuverability is reduces with the width of the drum wheel. Also, as the width of the drum wheel increases, the mass of the drum wheel increases, and the natural frequency or frequencies of the drum wheel decrease. As such, the strikes of the hammer may result in uncontrolled vibrations of the drum wheel in these frequencies.

Figure 4A:
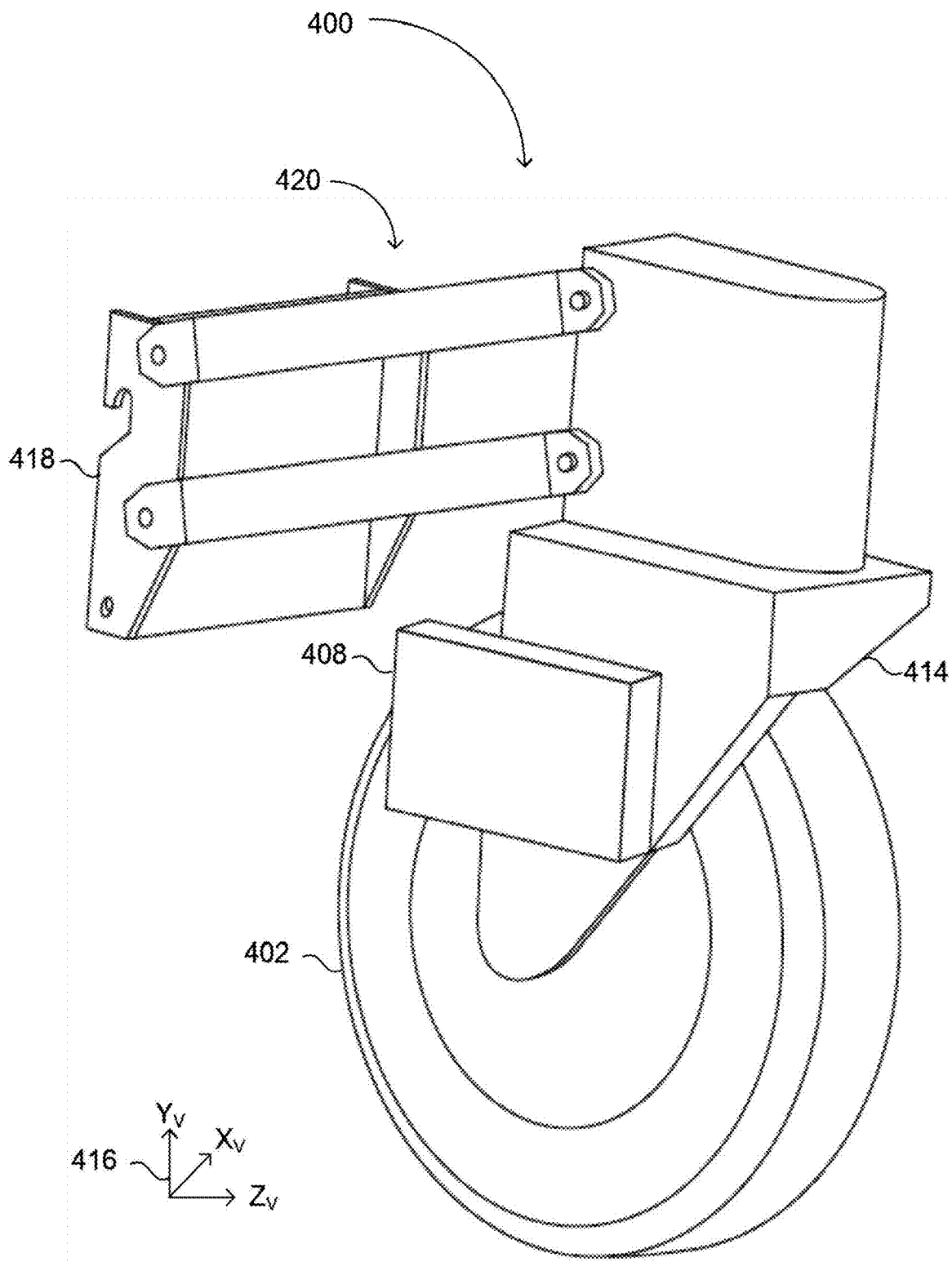
FIGS. 4A and 4B are schematic illustrations of a seismic source apparatus, constructed and operative in accordance with a further embodiment of the disclosed technique.
Figure 4B:
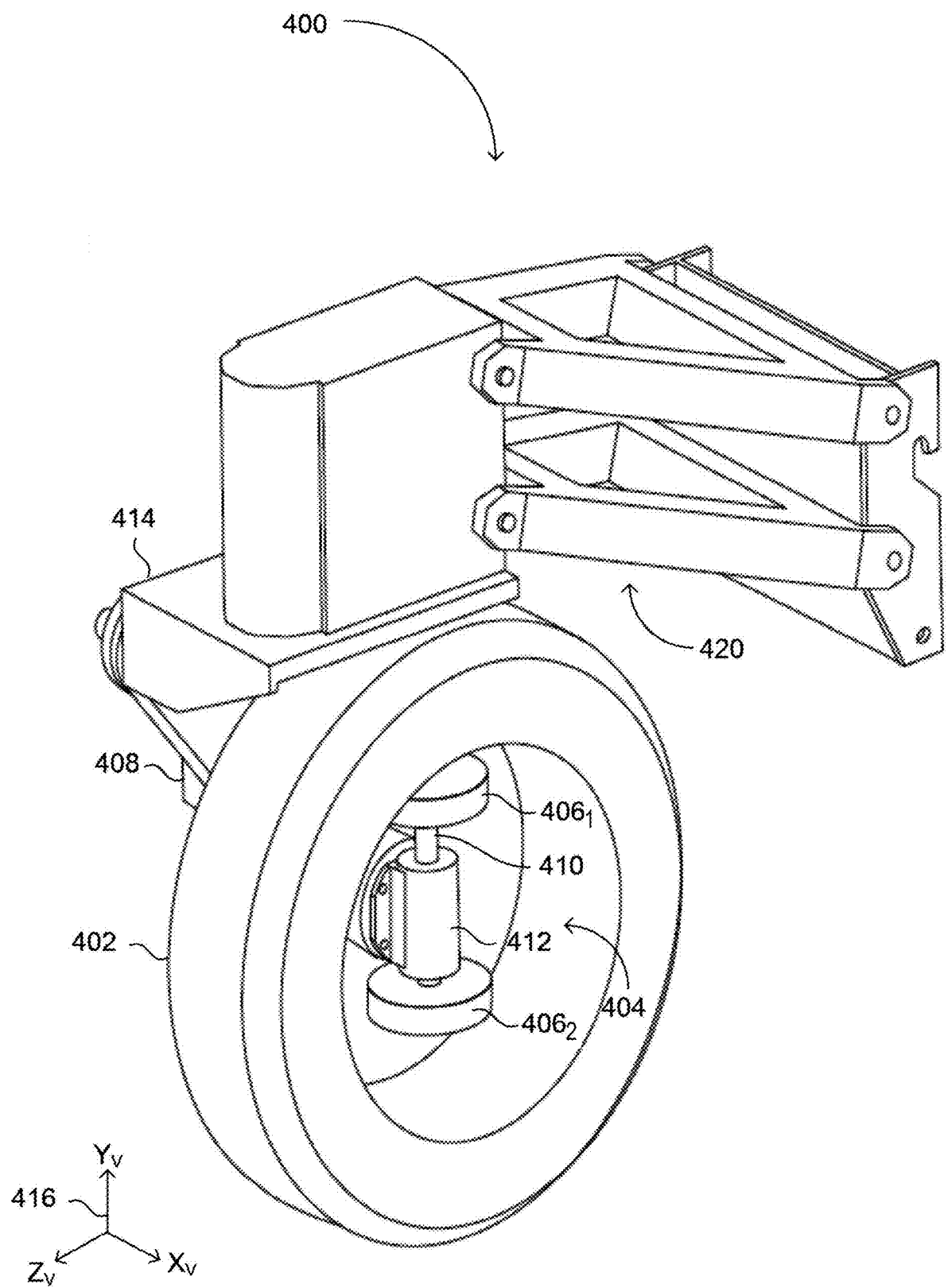

According to another example of the disclosed technique, the seismic source is located on the rotation axis of the source drum, and includes a double ended piston with weights attached to the ends thereof. The piston strikes or vibrates the axis of rotation of the drum as further explained below. Thus, energy is transferred from the axis of rotation of the drum, through the drum to the ground. Reference is now made to FIGS. 4A and 4B, which are schematic illustrations of a seismic source apparatus, generally referenced 400, constructed and operative in accordance with a further embodiment of the disclosed technique. Seismic source apparatus 400 may be employed in any scenario described herein above, for example in conjunction with FIG. 1 or when the seismic source apparatus is mounted on a vehicle and may employ the principles described herein above in conjunction with FIGS. 2A-2D, or 3A-3G.

In seismic source apparatus 400, the movable mass of the seismic source unit includes a double ended piston with weights attached thereto as elaborated below, and the energy transfer element is a rolling drum also as elaborated below.

Seismic source apparatus 400 includes a source drum 402, a piston apparatus 404, two weights $406_1$ and $406_2$, and a piston controller 408. Piston apparatus 404 is a double ended piston apparatus. Piston apparatus 404 includes a piston 410 and a cylinder 412, where piston 410 is movable within cylinder 412. Weight $406_1$ is coupled with one end of piston 410 and weight $406_2$ is coupled with the other end of piston 410. Cylinder 412 is coupled with the rotation axis of source drum 402. Source drum 402 is rotatably coupled with a source platform 414 (i.e., source drum 402 can rotate relative to source platform 414). Piston controller 408 is coupled with source platform 414.

Piston apparatus 404 is, for example, an hydraulic piston apparatus, a pneumatic piston apparatus or an electric piston apparatus. Piston controller 408 controls the motion of piston 410 in cylinder 412. It is noted that piston apparatus 404 is coupled with rotation axis of source drum 402 such that the motion of piston 410 includes a component in the direction of the Yv axis (i.e., vertical axis) of reference coordinate system 416. As piston 410 accelerates in either direction, weights $406_1$ and $406_2$ strike cylinder 412 at the end of the motion action thereof. Thus, piston 410 and weights $406_1$ and $406_2$ vibrate cylinder 412 which transfers the vibratory energy to the rotation axis of source drum 402, and to the ground through source drum 402. In other words, source drum 402 couples the energy produced by piston apparatus 404 to the terrain over which source drum 402 rolls, via the rotation axis of source drum 402.

Also, source platform 414 may be coupled with a vehicle via a vehicle interface 418. Source platform 414 is coupled with vehicle interface 418 via a motion de-coupling assembly 420. In FIGS. 4A and 4B, motion de-coupling assembly 420 is a 4-link suspension enabling, source platform 414 to move in the direction of the Yv axis (i.e., vertical axis) of reference coordinate system 416. Thus, source drum 402 remains coupled with the terrain, even when the terrain is uneven and includes holes, crevices, elevations bumps and the like.

Following is an implementation example of seismic source unit 400. Source drum 402 is coupled with an outer ring of a rotating barring. Source platform 414 is coupled with the inner ring of the rotating barring at one side thereof. Cylinder 412 is also coupled with the inner ring of the rotating barring at the other side thereof. Thus, cylinder 412 does not rotate with source drum 402. Control connections (e.g., pipes or wires) may pass through the inner ring of the rotating bearing between piston controller 408 and cylinder 412.

The embodiment of a seismic source unit described above in conjunction with FIGS. 4A and 4B is particularly suitable, but not only, for generating relatively high frequency seismic waves (e.g., up to an order of hundreds of Hertz). Also, this embodiment enables generating a specific waveform accounting for the motion of the vehicle motion, the response of the source drum and ground to the strike and the response of the seismic sensing apparatus. In all of the above embodiments described above, accelerometers may be coupled directly energy transferring elements (e.g., on hammer head 316 FIGS. 3C, on anvil 310—FIG. 3C, on weights $406_1$, $406_2$ FIG. 4A), enabling direct measurement of the energy produced and closed loop control on the seismic source. It is noted that seismic source apparatus may be employed with any one of the embodiment described hereinabove in conjunction with FIGS. 1, 2A-2D, 3A-3G. For example, seismic source apparatus may be coupled with a vehicle via a parallel 4-link suspension 420, which is similar to parallel 4-link suspensions described above in FIGS. 2A-2D and 3A-3G.

It will be appreciated by persons skilled in the art that the disclosed technique is not limited to what has been particularly shown and described hereinabove. Rather the scope of the disclosed technique is defined only by the claims, which follow.

The invention claimed is:

1. A seismic source apparatus, configured to be maneuvered by a vehicle over a terrain and operable while in motion, said seismic source apparatus comprising:
  a seismic source unit mounted on a source platform and configured to be maneuvered by the vehicle, the seismic source unit being configured to generate seismic waves while the vehicle is in on the move, said seismic source unit including at least one movable mass and an energy transfer element configured to maintain continuous and intimate contact with the terrain while the vehicle is in motion and the seismic waves are generated;

at least one motion de-coupling assembly associating said energy transfer element with said source platform or vehicle, and provided to reduce or prevent vibrational energy generated by said seismic source unit to be transferred to the source platform or the vehicle, wherein motion of said seismic source unit while the vehicle is in motion is independent of the motion of said vehicle and/or said source platform, wherein the motion of said seismic source unit is along or about at least one selected axis, within a determined range.

2. The apparatus according to claim 1, wherein said energy transfer element is a source drum, configured to rotate while moving on the terrain.

3. The apparatus according to claim 1, wherein said seismic source unit includes one or more masses, in a form of a double ended piston with the masses attached to ends thereof or in a form of an electromechanical unit.

4. The apparatus according to claim 1, wherein said seismic source unit includes a hammer and an anvil coupled with said energy transfer element, said hammer being configured to strike said anvil.

5. The apparatus according to claim 4, wherein said hammer includes a hammer head and two track rollers mounted on a track rollers axis and over a camshaft, said anvil is coupled perpendicularly between support prongs which are coupled with said energy transfer element, said camshaft includes a sloped portion and an edged portion, and is further coupled perpendicularly between said support prongs, said camshaft is operable to rotate about a vertical axis relative to said support prongs, such that when in rotation, said track rollers roll-over said sloped portion and rise, thereby raising said hammer and said hammer head, wherein said track rollers reach over edge portion of said camshaft, said hammer drops and said hammer head strikes said anvil.

6. The apparatus according to claim 1, wherein said source platform is a towed cart coupled with said vehicle via said motion de-coupling assembly.

7. The apparatus according to claim 1, wherein said motion de-coupling assembly comprises a 4-link suspension.

8. The apparatus according to claim 1, wherein said motion de-coupling assembly includes at least one decoupling element selected from a 4-link suspension, a universal joint, a suspension piston and a push-pull spring.

9. The apparatus according to claim 1, wherein said source platform is mounted on a manually maneuvered vehicle, a remotely maneuvered vehicle, an independently maneuvered vehicle or on a towed vehicle or cart.

10. A system comprising a vehicle or a moving platform, a seismic source apparatus according to claim 1 mounted on said platform or vehicle and one or more seismic detection unit.

11. A method for generating a seismic map of a terrain region, the method comprising:

maneuvering a seismic source unit mounted on a source platform over the terrain by a moving platform or a vehicle; said seismic source unit including at least one movable mass and an energy transfer element configured to maintain continuous and intimate contact with the terrain while the moving platform or vehicle is in motion;

generating seismic waves in a direction substantially perpendicular to the terrain while the moving platform or vehicle is in motion, vibrational energy generated by said seismic source unit when waves are generated are substantially prevented from being transferred to the moving platform or the vehicle by at least one motion de-coupling assembly positioned between said energy transfer element and said moving platform or vehicle;

detecting and optionally recording seismic responses received from the terrain over a period of time; and determining underground structure of the terrain to provide the seismic map.

12. The method according to claim 11, wherein seismic responses are received by using at least one seismic detection unit.

13. The method according to claim 12, wherein the detection unit comprises a laser source.

14. The method according to claim 13, wherein the laser source is a multibeam laser source.

15. The method according to claim 13, wherein the laser source is configured to illuminate an area of interest of the terrain.

16. The method according to claim 13, wherein the laser source is or comprises a plurality of laser beams.

17. The method according to claim 15, wherein the laser source directs a plurality of laser beams to generate an assemblage of laser spots on the area of interest.

18. The method according to claim 11, wherein said detecting comprises detecting of seismic waves that are reflected or diffracted or by detecting a seismic interaction of the seismic waves with objects, open spaces and modulations in ground composition.

19. A motion decoupling assembly for use in a seismic source apparatus comprising a seismic source unit and a seismic detection unit, the motion decoupling assembly comprising one or more decoupling elements associating said seismic source unit to a moving platform or vehicle carrying said seismic detection unit, wherein the motion decoupling assembly is configured to isolate said seismic detection unit from vibrational energy generated by said seismic source unit.

20. The assembly for use as defined in claim 19, wherein the one or more decoupling elements are selected from a 4-link suspension, a universal joint, a suspension piston and a push-pull spring.

* * * * *